(12) United States Patent
Jordan

(10) Patent No.: US 9,855,939 B2
(45) Date of Patent: Jan. 2, 2018

(54) BRAKE SYSTEM DEPLETION VALVE

(71) Applicant: Randy D. Jordan, Clanton, AL (US)

(72) Inventor: Randy D. Jordan, Clanton, AL (US)

(73) Assignee: Randy D. Jordan, Clanton, AL (US)

( * ) Notice: Subject to any disclaimer, the term of this patent is extended or adjusted under 35 U.S.C. 154(b) by 0 days.

(21) Appl. No.: 14/121,447

(22) Filed: Sep. 8, 2014

(65) Prior Publication Data

US 2016/0068149 A1    Mar. 10, 2016

(51) Int. Cl.
| | | |
|---|---|---|
| B60T 15/32 | (2006.01) | |
| B60T 15/52 | (2006.01) | |
| B60T 15/04 | (2006.01) | |

(52) U.S. Cl.
CPC .............. B60T 15/52 (2013.01); B60T 15/04 (2013.01); B60T 15/041 (2013.01)

(58) Field of Classification Search
CPC .......... B60T 15/54; B60T 15/52; B60T 11/34; B60T 15/02; B60T 15/24; B60T 15/024; B60T 17/04
USPC ...................................................... 303/19, 69
See application file for complete search history.

(56) References Cited

U.S. PATENT DOCUMENTS

| | | | | |
|---|---|---|---|---|
| 3,095,244 A | | 6/1963 | Valentine | |
| 3,145,064 A | * | 8/1964 | Billeter | B60T 15/54 |
| | | | | 137/625.27 |
| 3,228,730 A | * | 1/1966 | Schubert | B60T 13/403 |
| | | | | 303/13 |
| 3,359,869 A | * | 12/1967 | Avrea | B60T 13/263 |
| | | | | 188/1.11 R |
| 3,744,848 A | * | 7/1973 | Hardwick | B60T 13/261 |
| | | | | 137/107 |
| 3,947,072 A | * | 3/1976 | Plantan | B60T 13/263 |
| | | | | 303/13 |
| 3,998,495 A | | 12/1976 | Maxwell | |
| 4,058,349 A | * | 11/1977 | Ury | B60T 13/263 |
| | | | | 137/107 |
| 4,088,374 A | * | 5/1978 | Gute | B60T 15/02 |
| | | | | 303/9 |
| 4,119,351 A | * | 10/1978 | Durling | B60T 13/261 |
| | | | | 137/493.9 |
| 4,131,324 A | * | 12/1978 | Kurichh | B60T 13/265 |
| | | | | 303/7 |
| 4,166,654 A | * | 9/1979 | Snodgrass | B60T 17/18 |
| | | | | 188/151 A |
| 4,169,633 A | * | 10/1979 | Stearns | B60T 13/265 |
| | | | | 303/7 |
| 4,175,588 A | * | 11/1979 | Gute | B60T 15/02 |
| | | | | 137/625.4 |

(Continued)

OTHER PUBLICATIONS

Alabama State Department of Education Student Transportation Alabama School Bus Driver Handbook Rules, Regulations, & Recommendations Aug. 2000, 8 Pages Bulletin No. 29 Montgomery, AL.

(Continued)

*Primary Examiner* — Anna Momper
*Assistant Examiner* — Mahbubur Rashid

(57) ABSTRACT

An air brake valve designed to remove the air from a vehicle air brake system in order to apply parking brakes in a manner to prevent unauthorized release of said brakes, and to achieve regulatory pre-trip and D.O.T. inspection of system low pressure warning indicator as well as regulatory after trip parking procedures for school busses.

3 Claims, 2 Drawing Sheets

(56) References Cited

U.S. PATENT DOCUMENTS

| | | | | | |
|---|---|---|---|---|---|
| 4,182,535 | A | * | 1/1980 | Fannin | B60T 13/265 303/29 |
| 4,191,428 | A | * | 3/1980 | Durling | B60T 13/261 137/516.27 |
| 4,316,418 | A | * | 2/1982 | Hindin | B60F 1/046 105/165 |
| 4,817,536 | A | * | 4/1989 | Cripe | B60T 13/406 105/182.1 |
| 5,152,585 | A | * | 10/1992 | Patient | B60T 8/266 303/10 |
| 5,839,304 | A | | 11/1998 | Willis | |
| 6,024,419 | A | * | 2/2000 | Waldrop | B60T 13/665 303/15 |
| 2012/0216533 | A1 | * | 8/2012 | Schaffeld | F02B 33/44 60/611 |
| 2012/0221223 | A1 | * | 8/2012 | Schaffeld | F02B 33/38 701/102 |
| 2014/0103237 | A1 | * | 4/2014 | Herges | B60T 7/20 251/129.01 |

OTHER PUBLICATIONS

United States Department of Transportation Commercial Drivers License Manual 5.3—Inspecting Air Brakes 5.3.3—Step 7 Final Air Brake Check Sectin 11—Pre-Trip Vehicle Inspection 11.1.2—Air Brake Check 2005, 4 Pages.

* cited by examiner

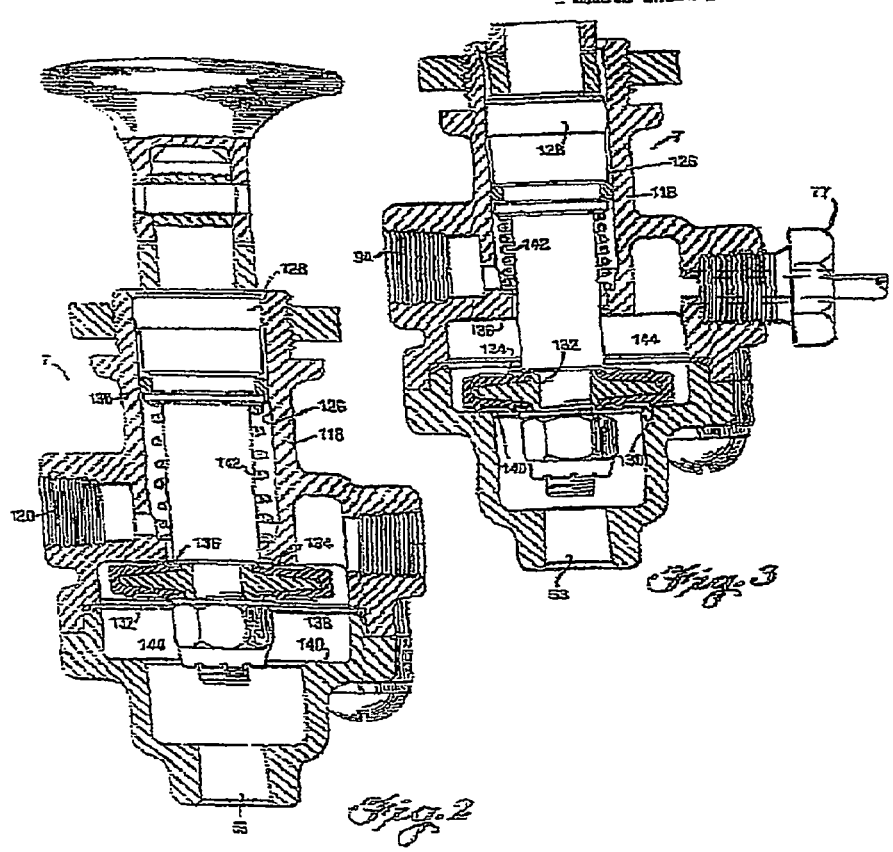

BRAKE SYSTEM DEPLETION VALVE

REFERENCES CITED

UNITED STATES PATENTS

| | | |
|---|---|---|
| 3,095,244 | Valentine | Jun. 25, 1963 |
| 3,998,495 | Maxwell | Dec. 21, 1976 |
| 5,839,304 | Willis | Nov. 24, 1998 |

The valve of the present invention is an improvement to a typical push-pull valve such as described in the U.S. Pat. No. 3,095,244 brake system and control valve therefore issued Jun. 25, 1963 to H. M. VALENTINE, ET AL. and assigned to Bendix-Westinghouse Automotive air brake company, Elyria, Ohio, a corporation of Delaware.

BACKGROUND OF THE INVENTION

This invention relates to compressed air operated brake systems for vehicles and more particularly to systems including one or more spring actuators for applying the brakes through the action of a spring under certain conditions as well as the depletion of said air aiding in pre-trip and D.O.T. regulatory inspection of said system as well as fail safe parking procedures. The Department of Transportation and the National Highway Traffic Safety Administration have regulations requiring the depletion of air pressure on every air brake operated vehicle in order to perform pre-trip inspections of said systems low pressure warning devices before the beginning trip of every day. Also, Department of Transportation officers may require the depletion of said air supply at any time, during any trip, if they wish to perform an inspection of said system. In addition, federal regulations require all school bus drivers to deplete air from the braking system to below approximately 40 p.s.i. every time the vehicle is parked post trip to ensure spring brake application. To date, the standard method of system air depletion used in the field is to repetitively pump or fan the foot brake pedal. This repetitive pumping action must be done until service air pressure is depleted to an air pressure low enough to cause low air pressure actions in the system. The normal operating air pressure of the system is approximately 120 p.s.i. Each pump or fan of the pedal releases approximately 3 p.s.i., therefore it would normally take 26 pumps of the foot brake pedal to effectively deplete the air pressure to necessary p.s.i. This process causes excessive wear on all parts of the braking system every day and every time the process is performed. In addition, as for the parking of air brake commercial vehicles and more particularly school buses, these vehicles do not have a park position on the transmission and places all parking responsibilities on the spring brakes. The primary danger of this process is that as long as the air brake system has a reserve air pressure above approximately 40 p.s.i. the standard push pull parking brake valve can be released by anyone and the vehicle is capable of unwanted and uncontrolled roll off. As a result of this dangerous condition federal guidelines are in place requiring school bus drivers to deplete system air pressure to below 40 p.s.i. every time the vehicle is post-trip parked by fanning the foot brake pedal. This method leaves room for human error of not depleting air pressure to proper p.s.i., as well as afore mentioned wear and tear of entire braking system. As of yet, all other commercial vehicles are not required to deplete system air pressure for final parking which leaves possibly every parked commercial air brake supplied vehicle sitting with the ability of unwanted, uncontrolled roll off. The present invention mechanically depletes the air pressure of said system to proper p.s.i. and achieves low pressure warning system test as well as fail safe parking procedures.

SUMMARY OF THE INVENTION

One of the principle objects of the present invention is to provide a novel safety brake construction on vehicles equipped with a conventional compressed air braking system, which is so constituted as to mechanically apply the brakes by depleting reservoir air pressure to below a predetermined value.

A further objective is to provide a novel parking brake construction wherein the vehicle operator must be in the cab of the vehicle in order to operate vehicle air compressor and rebuild reserve air pressure to above a predetermined p.s.i. before releasing the brakes of a parked vehicle.

Another objective is to provide a mechanical device designed to deplete reservoir air pressure from a vehicles air brake reserve air tanks in order to force the brakes to be applied to said vehicle by springs, and prevent the possibility of accidently releasing said brakes.

A further objective is to provide said parking brake construction used on any vehicle, machinery or equipment that uses air spring brakes.

Still a further objective is to provide in an arrangement of the above Character a novel construction wherein springs are employed for automatically applying the brakes by depleting the system air pressure to a predetermined pressure, and wherein the springs may only be released by operator controlled device in the cab once the system pressure is rebuilt to a pressure significantly high enough to permit the vehicle to safely proceed under the control of the compressed air braking system.

Another advantage is to provide a novel air depletion valve construction for the system expressed. which is manually operable to force the safety spring brake actuators to apply the brakes by depleting the system air pressure to a pre-determined psi to prevent accidental or unwanted roll off of parked vehicle.

Still another advantage is to provide a novel means to mechanically deplete system air pressure thereby achieving regulatory procedures of performing vehicle air brake low pressure warning test.

An yet another advantage is to deplete system air pressure to proper p.s.i. in order to mechanically apply spring brakes safely achieving school bus regulatory parking procedures.

Yet another objective includes the incorporation of the brake system air depletion valve in a compressed air braking system in a novel manner as to permit relatively simple installation in conventional air brakes systems while retaining all the desirable operating characteristics of such systems.

A still further objective includes the provision of a novel valve of the above type which comprises relatively few parts accomplished with minimal manufacturing change and may be readily connected in existing types of air brake systems.

BRIEF DESCRIPTION OF THE DRAWINGS

The above and further objectives of the invention will appear more fully hereinafter from a consideration of the following detailed description when. taken in connection with the accompanying drawings which disclose one form of the invention. It will be expressly understood, however, that the drawings are employed for purposes of illustration only and are not to be taken as a definition of the limits of the invention, reference being had for this purpose to the appended claims.

Referring to the drawings wherein similar reference characters refer to similar parts throughout the several views:

FIG. 2 is an axial sectional view of a brake system air depletion valve used in the system of FIG. 1, the valve being shown in the closed position; and FIG. 3 is a partial view in section of the valve of FIG. 2 shown in the open or air depletion position.

DETAILED DESCRIPTION OF THE DRAWINGS

Figure 1:
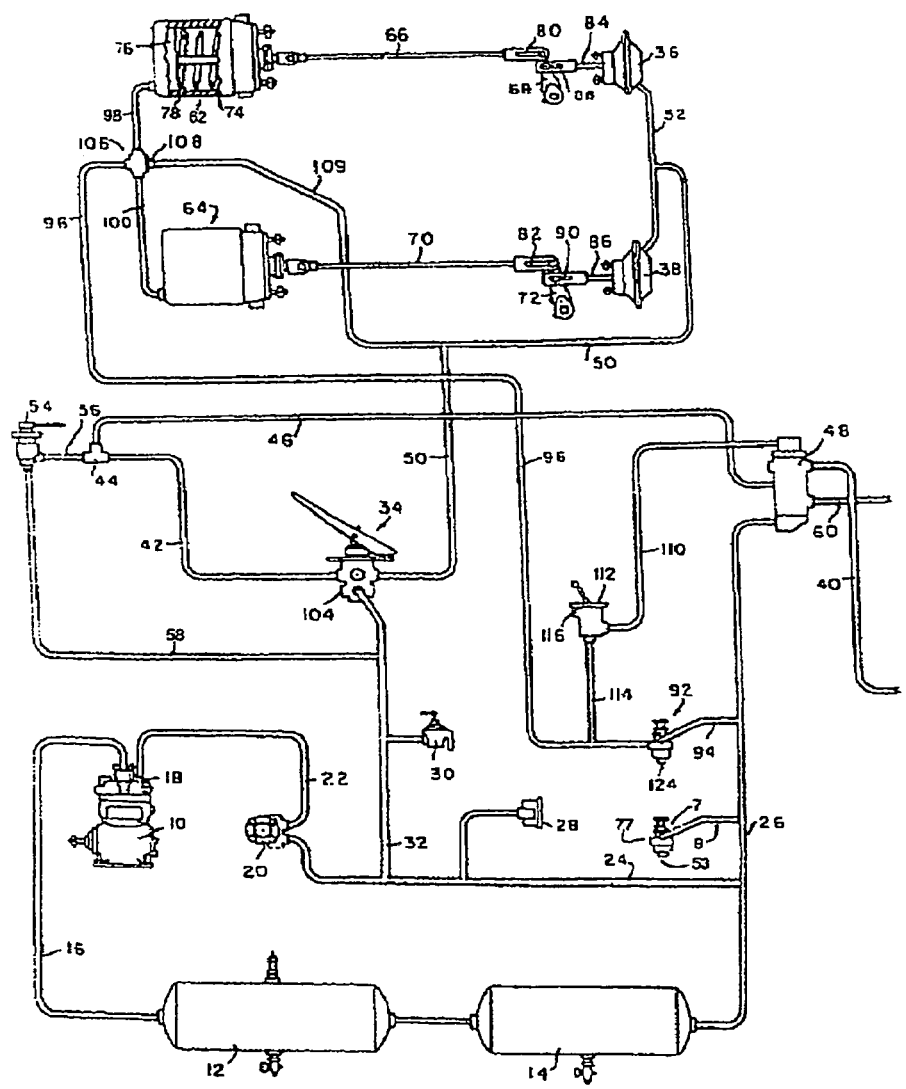
FIG. 1 is a diagrammatic view of an air spring brake system embodying the features of the present invention.

The novel brake system air depletion valve of the present invention is illustrated in FIG. F in connection with a conventional type of air brake system used on air spring brake vehicles. More particularly, the system includes a compressor 10, for supplying compressed air to series-connected reservoirs 12 and 14 through a conduit 16, the compressor having the usual unloader 18 controlled by a conventional governor 20 through conduits 22 and 24 connected with an outlet or tractor emergency conduit 26. A suitable pressure gauge 28 is connected with the conduit 24 and a conventional low pressure indicator 30 is connected with conduit 32 inter-connected conduit 24 with a manually operable self-lapping brake valve 34 which may be of any suitable type. Brake valve 34 may be provided with two outlet conduits for applying the service brake chambers 36 and 38 on the tractor and for charging the trailer service conduit 40 to apply the trailer brakes in service. As shown, conduit 42 is connected with conduit 40 through a double check valve 44 of conventional construction, a conduit 46 and a tractor protection valve 48. It will be understood by those skilled in the art that valve 48 is designed to conserve in the tractor brake system a predetermined air pressure in the event of leakage in the trailer brake system or a brake-in-two of the connected vehicles. Outlet conduit 50 is connected with conduit 52 which in turn is connected with the brake chamber 38 and 36, it being obvious that due to the connections just described, application of the brake valve 34 will simultaneously charge the conduits 42, 50 and 52 to apply the trailer and tractor brakes in service. if desired, a hand operated brake valve 54 of conventional construction may be connected to the double check valve 44 and the conduit 32 by means of the conduit 56 and 58, such valve enabling the operator to charge the conduits 46 and 40 to apply the brakes on the trailer at anytime that such valve is moved to a position to connect conduits 56 and 58. Normally the valve 54 occupies a position where communication between conduits 56 and 58 is interrupted. Tractor emergency conduit 26 is connected with trailer emergency conduit 60 through the tractor protection valve 48. The novel safety brake actuators and brake system air depletion valve of the present invention are interconnected and associated with the above described conventional vehicle air brake system in order to apply a relatively simple, but highly efficient spring operated parking brake, as well as providing a highly efficient means of performing the low air pressure warning test of said system. As shown, the system includes a pair of air spring actuators 62 and 64 of similar construction, actuator 62 being connected through a piston rod 66 with the brake applying arm or slack adjuster 68 while the actuator 64 is connected through a piston rod 70 with the brake applying arm or slack adjuster 72. Actuator 62 and 64 include a chamber or cylinder 74 in which a piston 76 is slide-ably mounted, the latter being rigidly connected with the piston rod 66. A spring 78 constantly tends to move the piston 76 toward the left, as viewed in FIG. 1, to apply the brake through the rod 66, and does apply the brake when the air pressure in the system drops to a predetermined pressure, for example, below 40 p.s.i. As illustrated in FIG. 1, the spring actuators 62 and 64 are illustrated in applied position and it is assumed that no pressure is present in the system. Under these conditions, piston rods 66 and 70 are moved toward the left to apply the brakes through the pin and slot connections 80 and 82. It will be understood that during such brake applying movement of the arms 68 and 72 no movement of brake rods 84 and 86 respectively associated with brake chambers 36 and 38 will occur, due to pin and slot connections 88 and 90. With the above arrangement, it will be understood that when. the actuators 62 and 64 occupy the position illustrated in FIG. 1, the vehicle brakes are applied solely by spring action due to the absents of air pressure.

System also includes a two position control valve 92, which in one position is adapted to conduct or apply reservoir air pressure from the conduit 26 to the spring actuators 62 and 64 to the left of pistons 76 therein by way of supply conduit 94 and conduits 96, 98 and 100. Under these conditions, as soon as the system air pressure admitted to actuators 62 and 64 reaches a predetermined pressure, as for example above 40 psi, pistons 76 will be moved to compress the springs 78 and release the spring brakes. Note that only the application of system air pressure supplied by means of valve 92 can release the spring brakes since the spring 78 always applies the brakes in the absence of air pressure of above approximately 40 p.s.i.

In the other position of control valve 92, it shall be understood that the supply conduit 94 is shut off preventing the flow of system reserve air pressure to the spring 78 and conduit 96 is connected to the atmosphere through an exhaust 124 of the valve 92 to permit application of the brakes by means of the spring actuators 62 and 64. Note how brakes are applied by springs due to absents of air pressure. Conduits 98 and 100 are connected through a quick release valve 106. Such valves include and exhaust connection 108 which automatically would vent the conduits 98 and 100 whenever the pressure in 96 drops to a value slightly lower than that in conduits 98 and 100. In the form shown, the exhaust 108 is connected through the conduit 109 with the outlet or service conduit 50. With such an arrangement, air pressure may be conducted to the spring actuators by way of conduits 96 or 109 depending upon which pressure is greater, the valve 106 thus functioning as a selectively operable valve. Valve 92 may be manually moved to the two positions referred to above. Such valve is also constructed as to be automatically moveable from said one to the said other position to automatically permit spring brake actuation whenever the system pressure in supply conduit 94 is depleted by current invention to a predetermined pressure of below approximately 40 p.s.i. thus providing an effective safety system for automatically and mechanically applying the brakes. Valve 7 of the current invention is interconnected with valve 92, conduits 94, 9, 26, 24, 32, reservoirs 12 and 14 and low pressure indicator 30 to achieve system air depletion to a pre determined pressure set forth by the pressure regulated exhaust port 77. It will be understood by those skilled in the art that valve 92 is designed to shut off or block air flow and pressure to springs 78 or apply air pressure to springs 78.

Novel means are employed by the present invention in order to control the spring actuators 62 and 64. As shown, such means include a two position brake system air depletion valve 7, to be described herein after in detail, which in one position shown in FIG. 2 is closed and preserves system reservoir air pressure and has no effect on air brake system. In the other or open position of the brake system air depletion valve 7, shown in FIG. 3, the supply conduit 26 is connected to the atmosphere through a pressure regulated exhaust 77 of valve 7 to deplete the system reservoir air from the tanks 12 and 14 to a pre determined p.s.i. set by the regulated outlet 77 and thereby applying brakes by means of the spring actuators 62 and 64. In addition, all spring brake system low air pressure actions will be achieved when system reserve air pressure reached a value of below approximately 40 p.s.i. It shall be understood that all brake related components of the system including springs, valves, gages, buzzers, etc. have been set to react to system low air pressure ranging from approximately 60 p.s.i. to approximately 40 p.s.i. Normal system operating air pressure is approximately 120 p.s.i.

It will be understood by those skilled in the art, that since compressor 10 is for the purpose of supplying air pressure to the system, the compressor should be disengaged before employing valve 7, as valve 7 is for depleting reservoir pressure and compressor 10 is for restoring reservoir pressure. Also, let it be known, control valve 92 as described in U.S. Pat. No. 3,095,244 by Valentine column 3 lines 8-24, conducts reservoir air pressure to springs 78 when in said one position and shuts off reservoir air supply from conduit 94 when in said other position. In neither position does valve 92 deplete reservoir air pressure for the purpose of applying a parking break. Valve 92 only blocks or shuts off the air pressure from conduit 94 and the absence of air pressure to the springs 78 allows spring 78 to apply brakes by the springs design, but as long as system reservoir tanks contain air pressure of above approximately 40 p.s.i, valve 92 can be moved to the one position and re-conduct reservoir pressure from conduit 26 to the spring actuators 62 and 64 and re-release parking brakes. This feature of retaining reservoir air pressure renders anyone who may access the cab, authorized or unauthorized, to have the ability to release the brakes thus rendering the vehicle capable of unwanted or uncontrolled roll off. The brake system air depletion valve 7 is designed to prevent spring brakes from being removed by depleting system reservoir air pressure to below a predetermined pressure set by the pressure regulator outlet 77 rendering valve 92 incapable of releasing said brakes due to system low air pressure. Therefore, the compressor must be engaged and ran for a period of time long enough to rebuild system reservoir air pressure to above approximately 40 p.s.i. before spring brake actuators can be released.

The present invention is designed to mechanically deplete the air from reservoirs 12 and 14 to a predetermined p.s.i. low enough to prevent valve 92 from being operable and cause spring brake actuators 62 and 64 to apply brakes as expressed above when pressure is reduced to a predetermined pressure of below approximately 40 p.s.i., as well as causing the low air pressure indicator to be activated. When valve 7 is connected in the system as shown in FIG. 1 wherein valve 7 is connected to conduit 9,26,94,24,32, and reservoir tanks 14 and 12 prior to valve 92 and moved by operator to depletion position of FIG. 3 they system reservoir air pressure will be exhausted through valve 7 by way of the pressure regulated exhaust 77. When the system reservoir air pressure is depleted by valve 7 to approximately below 40 p.s.i., all low pressure actions will occur to include forcing valve 92 to shift to said other position as described in U.S. Pat. No. 3,095,244 of Valentine column 3 line 41-45 and permits the spring 78 to apply the brakes in an un-releasable. Valve 7 by design, installation position, and operation effectively and mechanically depletes system reservoir air pressure and achieves all desired low air pressure actions.

Referring more particularly to FIGS. 2 and 3, the novel two position brake system air depletion valve 7 is illustrated therein as including a casing 118 provided with inlet and outlet ports respectively connected with conduit 9 and the atmosphere through a pressure regulated means of exhaust port 77. Casing 118 is also provided with a bore 126 for slideably receiving a valve plunger 128 having an O-Ring seal 130. The lower end of the plunger 128 carries a valve member 132 of rubbery material having an inlet valve 120 and a pressure regulated valve 77 on its upper face and an exhaust 53 valve on its lower face. The inlet valve 120 is constituted by an annular bead 134 adapted to contact a face 136 as shown in FIG. 2. A spring 142 is confined between a portion of the casing 118 and the plunger 128 and constantly tends to push the plunger upward to maintain the inlet valve closed. When closed, the area of the annular bead 136, is less than the area of the O-Ring 130 so that when the brake system air depletion valve 7 is in the closed position of FIG. 2, the valve will remain in such position even though the pressure at the port 120 rises to full reservoir pressure. The valve may however, be manually moved to the position shown in FIG. 3, in which event it will remain in such position, provided the pressure within chamber 144 above the valve member 132 is above a predetermined pressure set by built in pressure regulator of exhaust 77. This is due to the back pressure set forth by the pressure regulator in port 77. Hence, the valve member 132 is pressure responsive by reason of the pressure acting on the upper face there of over the area of the bead 140 to maintain the valve opened, the force effective on the O-Ring 130 and the force of the spring 142 until the pressure in the chamber drops to a minimum value set by pressure regulator in exhaust 77, at which time spring 142 moves the valve to the closed position of FIG. 2.

In operation, it is assumed that in FIG. 1, there is no air pressure in the system and that the spring brake actuators 62 and 64 are in the position shown so that the vehicle brakes are applied by the action of the springs 78. Brake system air depletion valve 7 is in the closed position and valve 92 is in emergency position and both will remain so until manually moved, regardless of the buildup of pressure in conduit 26. Under the above conditions, operator must crank vehicle and operate compressor 10 to charge reservoirs 12 and 14 as well as conduits 26, 24, 32, 58, 9 and 94 to full reservoir pressure. The operator, who must be in vehicle cab, may now operate the brake valve 34 which simultaneously charges conduits 50, 52, 109, as well as quick release valve 106, conduits 98 and 100 and spring brake actuators 62 and 64. The charging of service brake chambers 36 and 38 will then gradually apply the brakes through the slack adjusters 68 and 72 as the effect of the spring brake actuators 62 and 64 on the slack adjusters is gradually released.

As soon as the pressure within the actuators 62 and 64 has built up to a value above the minimum value of approximately 40 p.s.i. to effect a release of the spring brake application. the operator may manually move the valve 92 from the emergency to the release position where upon full reservoir pressure will be conducted to the actuators 62 and 64. Valve 92, thus effectively locks reservoir pressure in the actuators 62 and 64 in order to maintain them in the release position after they have been released.

The vehicle may then be operated in the same manner as any vehicle equipped with a conventional air brake system.

The valve 92 may be manually moved to its emergency position anytime desired, for example, when it is desired to park the vehicle. When this occurs, conduit 96 is connected with exhaust port 124 and the spring brake actuators are vented to the atmosphere through the brake valve and exhaust 108 as previously described.

It will also be recalled if the system pressure drops to the minimum value of approximately 40 p.s.i., the valves 92 will automatically move to the emergency position, and spring brake operation and low pressure warning indicator activation will occur.

Should the pressure in the system be less than the minimum value, the spring brake actuators will remain in applied position and the low pressure warning indicator will remain activated. During such low pressure conditions, the valve 7 will remain in the closed position, even if the operator manually moves valve to other position, the valves will immediately return to prior positions. Since a system pressure in excess of the minimum pressure is required to maintain the valves in the depletion position. The present invention thus provides in a conventional vehicle air brake system, a novel construction which enables a failsafe brake application through mechanical means, by causing the system pressure to drop below an operating value for final parking. The aforesaid mechanical means is disclosed as an air depletion valve, capable of air pressure depletion and such valve has been incorporated in the system in such a manner as to be manually operable to apply the brakes in a manner requiring no special operations or techniques on the part of the operator. The two position valve is mounted in the cab so as to be readily operable every time the operator plans to park and exit the vehicle or perform the brake system low pressure warning test. The primary function of the present invention is to deplete the air pressure in the brake system and cause the spring brake to be applied for safe post trip final parking of vehicle and prevent accidental roll off of parked vehicle. A secondary function of the present invention is to deplete air pressure for the regulatory parking procedures of school buses and thirdly for regulatory low air pressure warning system test for pre-trip and Department of Transportation procedures.

While the invention has been particularly shown and described with reference to the preferred embodiments thereof, it will be understood by those skilled in the art that various alterations in form, detail and construction may be made therein without departing from the spirit and scope of the invention.

The embodiments of the invention in which an exclusive property right or privilege is claimed are described as follows:

1. An air depletion valve being installed in an existing compressed air spring brake system having a source of air pressure and series connected reservoir air tanks comprising:

a. a selectively operable valve being moveable to a second position to connect an inlet with a pressure regulated outlet capable of connecting the source of air pressure to the atmosphere and depleting a system reservoir air pressure to effect system low air pressure actions and moveable back to a first position to connect said pressure regulated outlet with an exhaust port;

b. said air depletion valve having a sealable member affixed to a moveable member;

c. said sealable member capable of maintaining said air depletion valve in depletion position by means of back pressure set forth by pressure regulated exhaust until air pressure is depleted to desired psi set forth by pressure regulated outlet;

d. means for blocking an entry of air pressure into said air depletion valve until moved to said depletion position by operator;

e. an air pressure regulated exhaust valve in said air depletion valve admitting the vehicle reserve air pressure to the atmosphere; wherein said air depletion valve being installed in said existing compressed air brake system to deplete system air pressure thereby achieving U.S. Department of Transportation pre-trip, level 1 or level 2 system low air pressure test.

2. The apparatus of claim 1, wherein said selectively operable valve includes a pressure responsive member subjected to the pressure from the pressure regulated outlet when said selectively operable valve is moved to said second position and maintain said selectively operable valve in said second position until air pressure from said source of air pressure is reduced to desired p.s.i. set forth by means of the pressure regulated outlet.

3. The apparatus of claim 1, having said valve installed in said existing compressed air brake system having means to deplete system air pressure thereby effecting regulatory, safety, and or post trip application of spring brakes.

* * * * *